Figure 1:
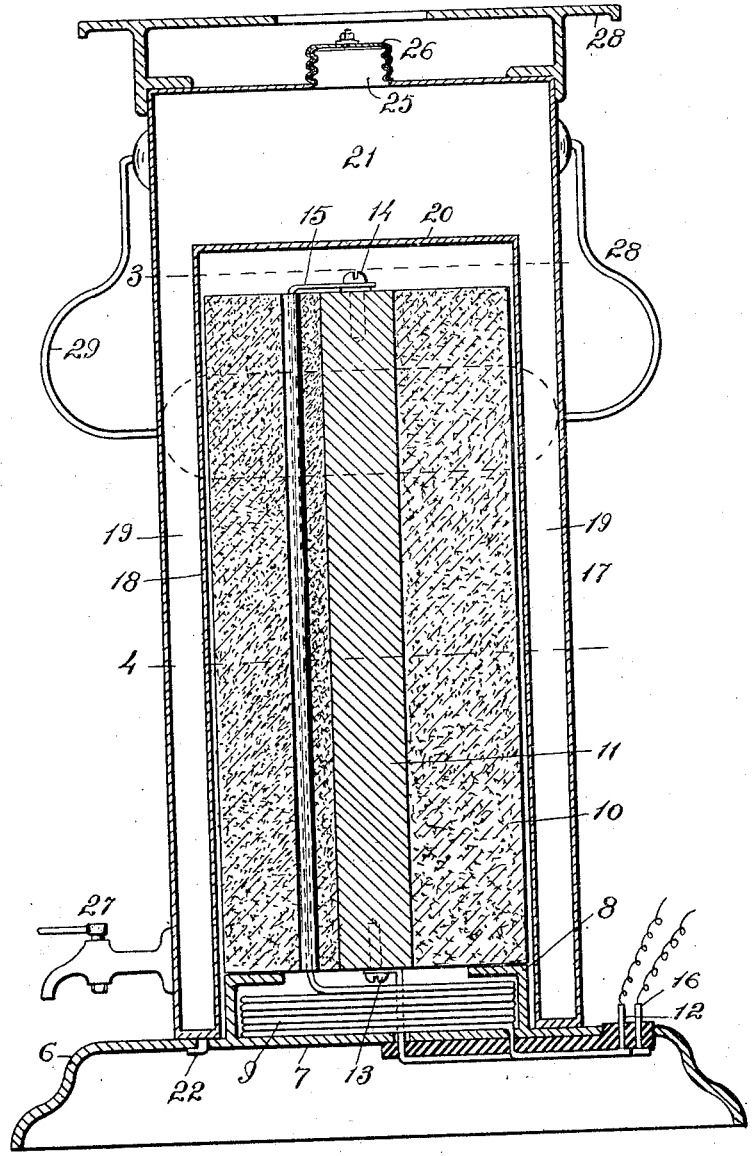

J. O. DIMMICK.
ELECTRIC HEATING DEVICE.
APPLICATION FILED JAN. 16, 1912.

1,047,004.

Patented Dec. 10, 1912.
2 SHEETS—SHEET 1.

Witnesses:
W. C. Weber
J. S. Plummer

Inventor:
J. O. Dimmick
By [signature]
Atty.

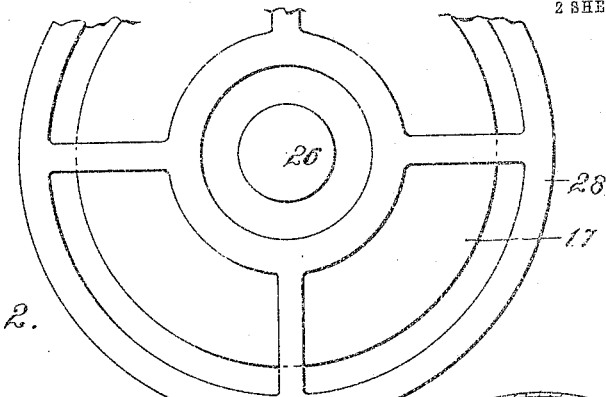
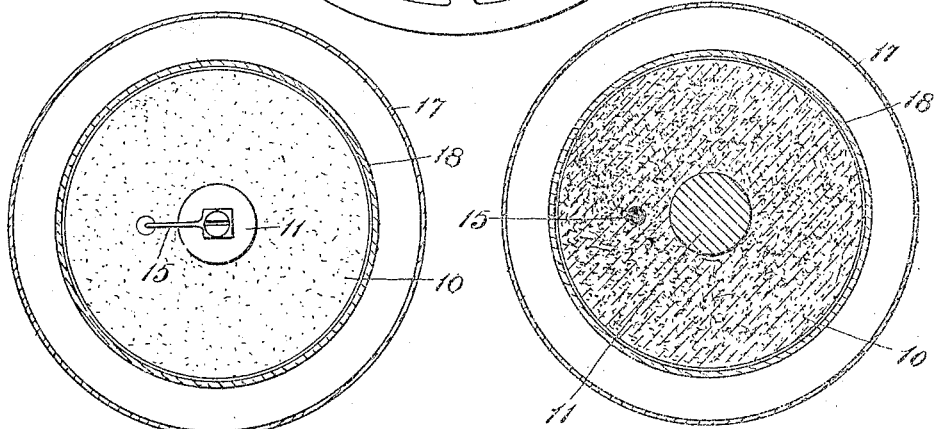
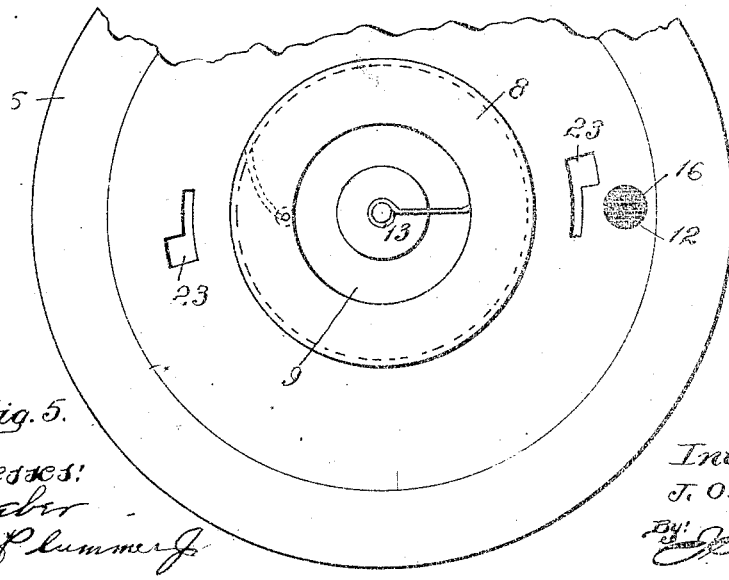

UNITED STATES PATENT OFFICE.

JOSEPH O. DIMMICK, OF LOS ANGELES, CALIFORNIA, ASSIGNOR TO ELECTRIC HEAT CONSERVING COMPANY, OF LOS ANGELES, CALIFORNIA, A CORPORATION OF CALIFORNIA.

ELECTRIC HEATING DEVICE.

1,047,004.  Specification of Letters Patent.  Patented Dec. 10, 1912.

Application filed January 16, 1912. Serial No. 672,007.

*To all whom it may concern:*

Be it known that I, JOSEPH O. DIMMICK, a citizen of the United States, and resident of Los Angeles, in the county of Los Angeles and State of California, have invented certain new and useful Improvements in Electric Heating Devices, of which the following is a specification.

My invention pertains to heating devices, and it has special reference to an electric heater which has certain peculiar features and advantages not possessed by heaters in the class to which this pertains.

The object of my invention is to provide an electric heater which has a heat conserving means, whereby the heat may be retained for a long period after the heating current has been cut off, and to accomplish this, I provide an electric resistance of suitable material which is placed within, or surrounded by a heat retaining substance, as for instance soapstone, which is known to retain heat for an indefinite period and in then surrounding or partially surrounding this heat retaining substance with a body of water to receive the heat of the electric element.

The dissymmetric diffusion of heat from an electric heating element as usually employed is not only a wasteful manner of utilizing a current, when it is in circuit, but there is no means of conserving the heat.

One of my objects is to provide a means whereby a body of water may be heated not only by radiation and convection during the period when the current is being used, but for an indefinite time after the current is cut off, and to this end the electric heating element does not apply the heat directly to the water but to a substance specially employed on account of its heat retaining qualities so that the time element may be employed in imparting the heat thus conserved, so that the heater is thus specially adapted for use in the sick room or for other purposes where it is not convenient or desirable to use the current at frequent intervals, all of which will now be set forth in detail.

In the accompanying drawings, Figure 1 is a central vertical section of my electric heater adapted for the use of heating a body of water. Fig. 2 is a top view of the heater. Fig. 3 is a horizontal section on line 3 of Fig. 1. Fig. 4 is a horizontal section in line 4 of Fig. 1, and Fig. 5 is a top view of the heater base.

In constructing my device I provide a base of any suitable size and shape, preferably of cast metal, 6, as shown in this instance, circular in form, with the central part thereof raised to form a platform 7. Centrally on this platform is an integral raised circular rim 8, with a central opening, within which is placed an electric heating or resistance coil 9. On the circular rim 8 thus formed is mounted a vertical cylindrical body 10, preferably of soapstone, or other suitable heat retaining material. This soapstone body has a central bore adapted to receive therein an electric heating element 11, such as carbon or other material usually employed for this purpose. One circuit terminal 12 connects with the lower end of this heating element 11, as shown at 13, and the other end of this element is connected as at 14, to a wire 15 which passes through a bore in the soapstone body and joins one side of the coil 9. The other side of the coil 9 has its wire connected up with the other circuit terminal 16, so that the current will thus flow in series through the coil and heating element. I therefore provide two separate heating elements, one within the body of the soapstone, and the other below the soapstone, the object being to not only have a means for directly heating the heat retaining body 10, but also to heat the base, and particularly to afford a separate and independent heating means for the lower end of the water jacket.

Surrounding the soapstone body 10, is a cylindrical shell 17, the said shell being removed a sufficient distance from the body to permit of an inner shell 18 which is in contact with the soapstone body to form, together with the outer shell, a space 19, so that water will thus surround the soapstone body. A partition wall 20 above the body serves to form a chamber 21 above the body, thereby inclosing the heat retaining element in such a manner that all the heat will be readily conveyed to the water without loss. This water cylinder is detachably secured to the base, and I prefer to make the attachment by means of a pair of hooked fingers 22, which extend down from the end of the cylinder and are adapted to enter the enlarged openings 23 of the slots, similar to a bayonet joint, so that the water cylinder may be readily removed. The upper end of the cylinder has a filling tube 25, adapted to be closed by a cap 26, and the lower end has a discharge faucet 27. On the upper end of the cylinder I place a removable grid 28 so arranged that it may receive any vessels which it is desired to heat or to keep warm. A bail 29 is also secured to the upper end of the cylinder so that it may be readily transported from place to place.

It will thus be seen that when a current of electricity is conveyed through the elements the heat set up is imparted to the heat retaining element, as the intermediary between the heating elements and the water, and this reservoir of heat, thus applied, substantially within the body of the water, will gradually give off its heat, as radiation takes place from the water, and thereby also enabling me to provide a means whereby I may use a smaller quantity of water than if I should use the same quantity as the soapstone occupies, and thus afford a means whereby I can heat up the water in a less time than would be possible with a large body of water, and at the same time give a longer range of heating action.

It is obvious that I may modify the resistance coil or equip the heater with any form or type of electric mechanism without departing from the spirit of my invention, which resides in the use of a heat retaining element within a body of water, adapted to directly receive the electric heat convection set up by the current.

What I claim as new, is:

1. A heater, comprising a base, a heat retaining element removably attached to said base, an electric heating element within said heat-retaining element, a liquid containing shell surrounding the heat-retaining element, and removably attached to said base, and a separate heating means below the aforesaid heating element.

2. In a heater, a base, an electric heating element and a heat-retaining element detachably secured to said base, a shell for receiving heat from the heat-retaining element, also detachably secured to the base, said base having a shell thereon, and a heating coil within said shell.

3. In a heater, a base, a shell on the base adapted to receive therein an electric heating coil, an electric heating element within the heat retaining element electrically connected with said heating coil, and a jacketed water space surrounding the coil at the base and the heat retaining element above the base.

4. In a heater, a base, a shell on said base adapted to receive an electric heating coil, a heat-retaining element above the heating coil, an electric heating element axially within the heat-retaining element, and electrically connected with the heating coil, a water-containing shell surrounding and surmounting the heat-retaining element, a faucet at the base of the water shell, a fitting tube at the top, and a removable lid or grid on top of the water shell.

Signed at the city of Los Angeles, county of Los Angeles, State of California, this 20th day of December, 1911, in the presence of witnesses.

JOSEPH O. DIMMICK.

Witnesses:
J. S. ZERBE,
GEO. BURDETT.